United States Patent [19]

Atriss et al.

[11] Patent Number: 5,371,416
[45] Date of Patent: * Dec. 6, 1994

[54] CIRCUIT AND METHOD OF SYNCHRONIZING CLOCK SIGNALS

[75] Inventors: Ahmad H. Atriss, Chandler; Benjamin C. Peterson, Tempe; Lanny L. Parker, Mesa, all of Ariz.

[73] Assignee: Motorola, Inc., Schaumburg, Ill.

[*] Notice: The portion of the term of this patent subsequent to Sep. 1, 2009 has been disclaimed.

[21] Appl. No.: 43,101

[22] Filed: Apr. 5, 1993

[51] Int. Cl.⁵ ............................................. H03K 9/06
[52] U.S. Cl. ..................................... 327/145; 327/291
[58] Field of Search ................. 307/269, 511, 525; 328/63, 155; 377/77, 69

[56] References Cited

U.S. PATENT DOCUMENTS

| | | | |
|---|---|---|---|
| 3,997,872 | 12/1976 | Cane et al. | 307/528 |
| 4,471,299 | 9/1984 | Elmis | 307/269 |
| 4,719,365 | 1/1988 | Misono | 307/269 |
| 4,736,162 | 4/1988 | Ishihara | 328/63 |
| 4,771,441 | 9/1988 | Spengler et al. | 328/63 |
| 4,912,564 | 3/1990 | Saitoh | 328/63 |
| 4,973,860 | 11/1990 | Ludwig | 328/63 |
| 4,988,901 | 1/1991 | Kamuro et al. | 307/525 |
| 5,134,637 | 7/1992 | Beyer et al. | 307/63 |
| 5,144,170 | 9/1992 | Parker | 307/269 |
| 5,159,278 | 10/1992 | Mattison | 328/63 |

*Primary Examiner*—Timothy P. Callahan
*Assistant Examiner*—T. T. Lam
*Attorney, Agent, or Firm*—Robert D. Atkins

[57] ABSTRACT

A digital clock circuit generates a high-speed clock and window pulses substantially centered about transitions of the high-speed clock in one quadrant of an integrated circuit (IC) and routes the high-speed clock and window pulses to other quadrants of the IC where a low-speed clock generator develops a low-speed clock signal from the window pulses. A control circuit checks alignment between the high-speed and low-speed clock signals and adjusts first and second shift registers to control the delay in generating the low-speed clock as necessary to maintain alignment. The first shift register controls the falling edge of the low-speed clock signal and the second shift register controls the rising edge of the low-speed clock signal.

12 Claims, 5 Drawing Sheets

CIRCUIT AND METHOD OF SYNCHRONIZING CLOCK SIGNALS

BACKGROUND OF THE INVENTION

The present invention relates in general to digital clock circuits and, more particularly, to a digital clock circuit for synchronizing the edges of a low-speed clock signal to a high-speed clock signal.

Many digital systems use two or more clock signals operating at different frequencies for transferring data throughout the system. A common procedure for generating a high-speed clock and a low-speed clock is to feed an external clock source into a phase lock loop (PLL) and develop the high-speed clock signal at the output of the voltage controlled oscillator (VCO) of the PLL. The low-speed clock may be taken at the output of a divide-by-N circuit in the feedback path between the output of the VCO and the phase detector of the PLL. The high-speed and low-speed clock signals are buffered and routed throughout the system to perform the intended functions.

The logic circuit using the high-speed and low-speed clock signals may be a considerable distance from the PLL generation source. Therefore, the transitions of the high-speed clock signal and the low-speed clock signal can become misaligned at various points in the system primarily due to differences in propagation delay and capacitive loading in the different paths. In many applications, it is critical to have accurate alignment of the high-speed clock signal and the low-speed clock signal at the point of utilization. Otherwise, data may be clocked at the wrong points resulting in invalid data transfers. Thus, circuit designers have typically invested considerable time and effort into detailed analysis of the propagation paths to ensure proper alignment of the high-speed and low-speed clock signals at key points in the system. Unfortunately, the difficulty in aligning the clock edges of the different frequency clock signals often forces the designers to use more setup and hold time for the data transfers which limits the operating speed and bandwidth of the system.

Hence, a need exists for an improved clock generation circuit for providing proper alignment between the clock edges of high-speed and low-speed clock signals at the point of usage.

DETAILED DESCRIPTION OF THE PREFERRED EMBODIMENT

Figure 1:
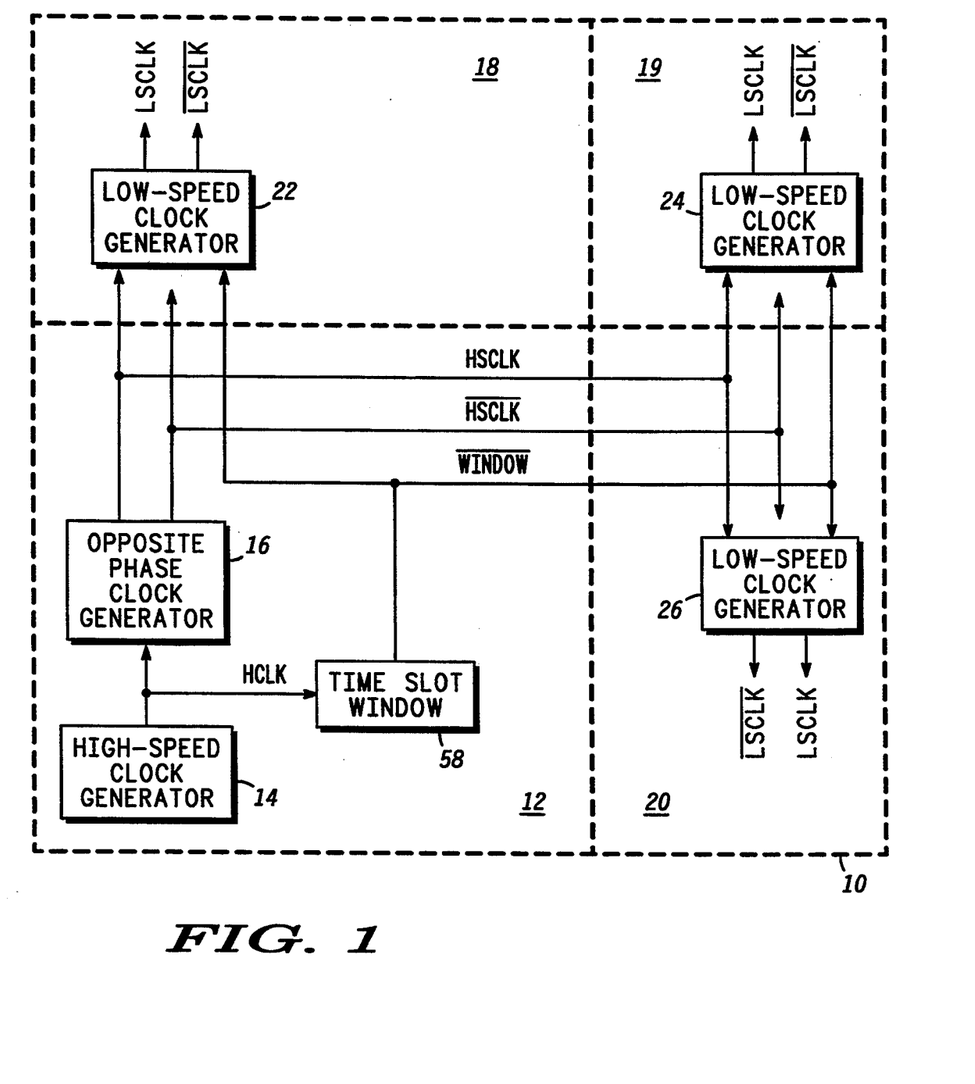
FIG. 1 is a block diagram illustrating an integrated circuit divided into four quadrants.

An integrated circuit 10 is shown in FIG. 1 logically divided into four quadrants. In quadrant 12, a high-speed clock generator 14 develops a high-speed clock HCLK using, for example, a phase lock loop (not shown) and taking the high-speed clock from the VCO output. Opposite phase clock generator 16 produces opposite phase high-speed clock signals HSCLK and $\overline{HSCLK}$ in response to the HCLK clock signal. The HSCLK and $\overline{HSCLK}$ clock signals are routed to quadrants 18, 19 and 20 which may be considerable distance from high-speed clock generator 14. In quadrant 18, low-speed clock generator 22 develops LSCLK and $\overline{LSCLK}$ low-speed clock signals based on the HSCLK clock signal. The HSCLK and $\overline{HSCLK}$ clock signals and the LSCLK and $\overline{LSCLK}$ clock signals in quadrant 18 serve logic circuits in that quadrant needing high-speed and low-speed clock signals. The LSCLK and $\overline{LSCLK}$ clock signals maintain alignment with HSCLK because the former are derived from the latter in the local quadrant. Similarly, low-speed clock generators 24 and 26 in quadrants 19 and 20, respectively, also develop LSCLK and $\overline{LSCLK}$ low-speed clock signals based on the HSCLK clock signal for use in the local quadrant.

A key feature of the present invention is creating the LSCLK and $\overline{LSCLK}$ clock signals from the HSCLK clock signal within the local quadrant. It is important that the LSCLK and $\overline{LSCLK}$ clock signals maintain alignment with the HSCLK clock signal. Thus, the physical area of quadrant 12 must be selected such that LSCLK and $\overline{LSCLK}$ do not travel so far as to become misaligned with HSCLK clock signal. Once a quadrant becomes so large that HSCLK and LSCLK clock alignment becomes a problem again, it is necessary to further subdivide the IC and introduce another low-speed clock generator like 22. There is one low-speed clock generator per quadrant receiving the HSCLK clock signal. The number of quadrants in a particular IC depends on its relative size and degree of routing.

Figure 2:
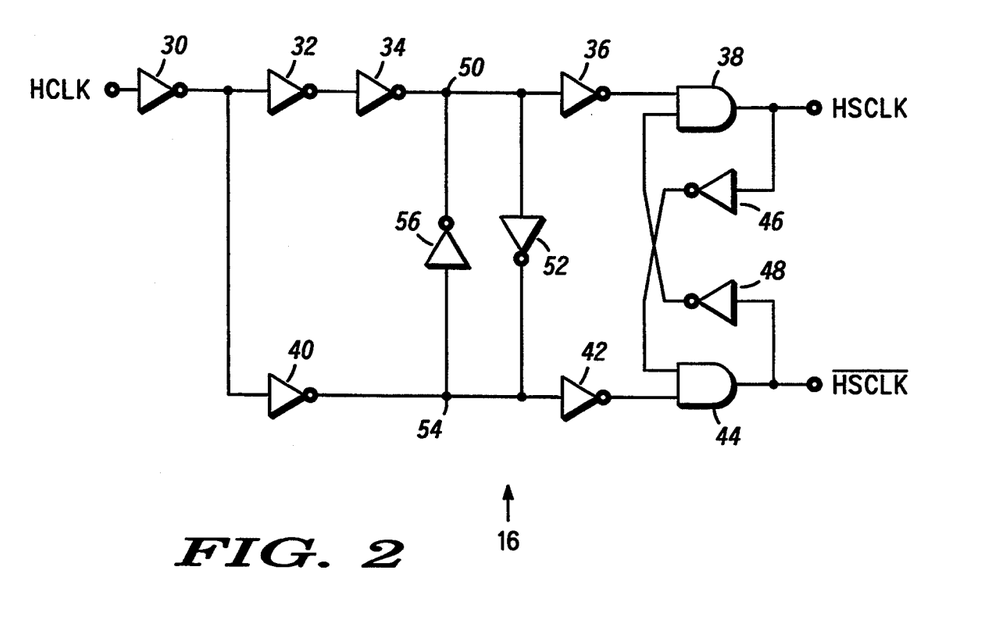
FIG. 2 is a schematic diagram illustrating the opposite phase clock generator of FIG. 1.

Opposite phase clock generator 16 is shown in FIG. 2 where the HCLK clock signal is applied through inverters 30, 32, 34 and 36 to a first input of AND gate 38. The output of inverter 30 is coupled through inverters 40 and 42 to a first input of AND gate 44. The output of AND gate 38 provides the HSCLK clock signal as applied through inverter 46 to a second input of AND gate 44. Likewise, the output of AND gate 44 provides the $\overline{HSCLK}$ clock signal as applied through inverter 48 to a second input of AND gate 38. The output of inverter 34 at node 50 is coupled through inverter 52 to the input of inverter 42, while the output of inverter 40 at node 54 is coupled through inverter 56 to the input of inverter 36.

When the HCLK clock signal switches to logic zero, the output of inverter 30 goes to logic one. Inverter 40 attempts to switch node 54 to logic zero before node 50 switches to logic one because node 54 is only two inverter delays away from the HCLK clock signal while node 50 is three inverter delays away. However, the transition of node 54 to logic zero is slowed by inverter 52 because node 50 is still logic zero two inverter delays after the HCLK clock signal changes to logic zero. Inverter 52 acts to hold node 54 at logic one until the output of inverter 34 changes state. A similar scenario follows when the HCLK clock signal switches to logic one. Thus, the transition of inverters 36 and 42 overlap 180° out-of-phase and cross approximately at the 50% mark, thereby overcoming the delay difference imposed by an unequal number of inverters between the HCLK clock signal and nodes 50 and 54.

When the output of inverter 36 is logic zero, the HSCLK clock signal at the output of AND gate 38 goes to logic zero. AND gate 44 receives logic ones from the outputs of inverters 42 and 46 for providing a logic one $\overline{HSCLK}$ clock signal. When the output of inverter 42 goes to logic zero, the $\overline{HSCLK}$ clock signal goes to logic zero. AND gate 38 receives logic ones from the output of inverters 36 and 48 for providing a logic one HSCLK clock signal. Hence, the HSCLK and $\overline{\text{HSCLK}}$ clock signals are opposite phase switching at substantially the 50% mark and operating at the frequency of the HCLK clock signal. HCLK and HSCLK operate in-phase.

A time slot window generator 58 is also located in quadrant 12 for generating a 10 ns $\overline{\text{WINDOW}}$ pulse (one-half cycle of HCLK) centered about the rising edge of every fourth cycle of the HCLK clock signal. An embodiment of time slot window generator 58 is disclosed in U.S. Pat. No. 5,144,170 entitled "CIRCUIT AND METHOD OF ALIGNING CLOCK SIGNALS", as divide-by-N circuit 14 and is hereby incorporated by reference. Divide-by-N circuit 14 in the U.S. Pat. No. 5,144,170 develops a logic one WINDOW pulse but the principal of operation is the same to produce a logic zero $\overline{\text{WINDOW}}$ pulse with an extra inverter. The $\overline{\text{WINDOW}}$ pulse is distributed to low-speed clock generators 22, 24 and 26 in quadrants 18, 19 and 20, respectively.

Figure 3:
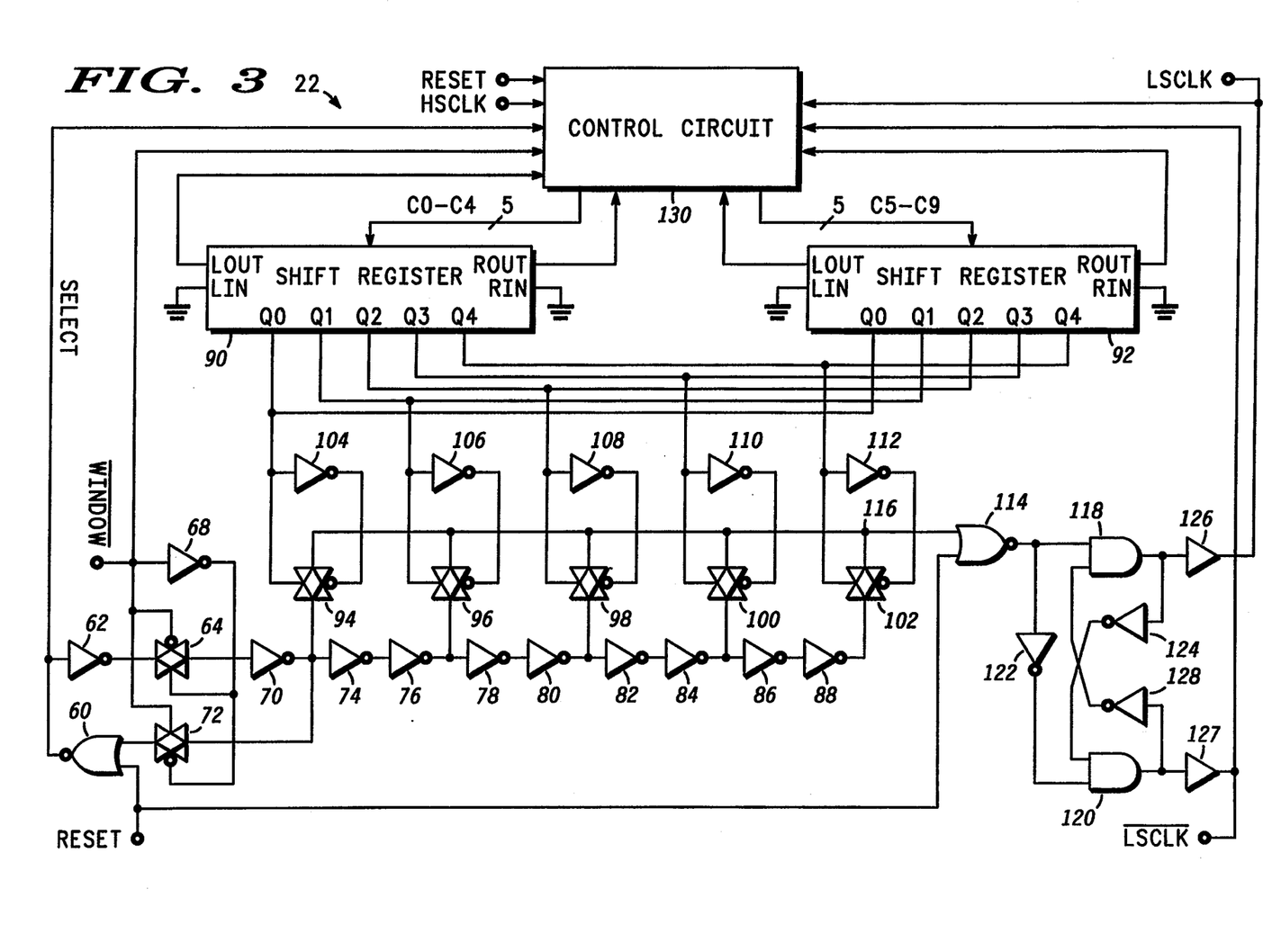
FIG. 3 is a schematic and block diagram illustrating the low-speed clock generator of FIG. 1.

Turning to FIG. 3, further detail of low-speed clock generator 22 is shown. Low-speed clock generators 24 and 26 follow a similar construction. The process of generating the LSCLK and $\overline{\text{LSCLK}}$ clock signals begins with receiving the $\overline{\text{WINDOW}}$ pulse centered about every fourth rising edge of the HSCLK clock signal. Since the $\overline{\text{WINDOW}}$ pulse goes to logic zero before HSCLK changes state to logic one, the time between the falling edge of the $\overline{\text{WINDOW}}$ pulse and the rising edge of the HSCLK clock signal provides an opportunity to generate the LSCLK and $\overline{\text{LSCLK}}$ clock signals aligned to the HSCLK clock signal.

First consider application of a logic one RESET pulse to NOR gate 60. The output of NOR gate 60 (SELECT) goes to logic zero and produces a logic one at the output of inverter 62. A logic zero $\overline{\text{WINDOW}}$ pulse enables transmission gate 64 with a logic one from inverter 68. The output of inverter 70 goes to logic zero. When $\overline{\text{WINDOW}}$ returns to logic one, transmission gate 64 becomes disabled while transmission gate 72 is enabled by the logic one $\overline{\text{WINDOW}}$ signal and the logic zero from inverter 68. The transmission gates of low-speed clock generator 22 may comprise back-to-back n-channel and p-channel transistors (not shown) with their drains and sources coupled together. The inverting input of the transmission gate is the gate of the p-channel transistor, while the non-inverting input is the gate of the n-channel transistor. The logic zero from inverter 70 passes through transmission gate 72 to a second input of NOR gate 60. After the RESET signal returns to logic zero, SELECT goes to logic one with logic zeroes at both inputs of NOR gate 60. Low-speed clock generator 22 is ready to begin generating LSCLK and $\overline{\text{LSCLK}}$ clock signals.

The next $\overline{\text{WINDOW}}$ pulse enables transmission gate 64 to pass a logic zero from inverter 62 and produce a logic one at the output of inverter 70. The output signal from inverter 70 also propagates through inverters 74, 76, 78, 80, 82, 84, 86 and 88 creating a variable length delay path. Inverters 74–88 may each have a delay of say 0.5 ns. For example, the output signal from inverter 70 is delayed 1.0 ns to the output of inverter 76, 2.0 ns to the output of inverter 80, 3.0 ns to the output of inverter 84 and 4.0 ns to the output of inverter 88. Shift registers 90 and 92 control transmission gates 94, 96, 98, 100 and 102 by way of inverters 104, 106, 108, 110 and 112 to tap the appropriate delayed signal necessary to align the LSCLK clock signal with the HSCLK clock signal. For example, enabling transmission gate 94 results in zero delay (neglecting delay through transmission gate 94) for the output signal from inverter 70 to a first input of NOR gate 114 at node 116. At the other end of the range, enabling transmission gate 102 results in 4.0 ns delay for the output signal from inverter 70 to node 116, again neglecting any delay through transmission gate 102.

Shift registers 90 and 92 are 5-bits wide and receive an initial pattern of "00100" (single logic one and the rest logic zeroes). The single logic one in shift registers 90 and 92 may be shifted right or shifted left with a corresponding logic zero fill from the left input LIN or right input RIN. The output state of NOR gate 60 selects the controlling shift register in a mutually exclusive manner, further explanation forthcoming.

A logic one SELECT signal enables the bit pattern stored in shift register 90 to control transmission gates 94–102 during the low state of LSCLK. A logic zero SELECT signal enables the bit pattern stored in shift register 92 to control transmission gates 94–102 during the high state of LSCLK. As noted above, the SELECT signal presently has a logic one output state. Thus, the "00100" bit pattern at the Q0–Q4 outputs of shift register 90 enables transmission gate 98 and disables transmission gates 94, 96, 100 and 102. The logic one from inverter 70 is delayed 2.0 ns to the output of inverter 80 and then passes through transmission gate 98 to produce a logic zero at the output of NOR gate 114. With one input of AND gate 118 at logic zero, the LSCLK clock signal at its output is also logic zero. AND gate 120 receives logic ones from the outputs of inverters 122 and 124 for providing a logic one $\overline{\text{LSCLK}}$ clock signal. The LSCLK and $\overline{\text{LSCLK}}$ clock signals are buffered by buffers 126 and 127. Thus, the low state of LSCLK and high state of $\overline{\text{LSCLK}}$ are established by a first $\overline{\text{WINDOW}}$ pulse ideally with transitions at the rising edge of HSCLK.

After $\overline{\text{WINDOW}}$ returns to logic one, transmission gate 72 passes the logic one from inverter 70 to the second input of NOR gate 60. The SELECT signal goes to logic zero and the output of inverter 62 goes to logic one. The next $\overline{\text{WINDOW}}$ pulse occurs four HCLK cycles later and enables transmission gate 64 again. The output of inverter 70 goes to logic zero. The logic zero SELECT from NOR gate 60 selects shift register 92 having an "00100" output state thereby enabling transmission gate 98 to pass the logic zero delayed 2.0 ns from inverter 70 to node 116. The output of NOR gate 114 goes to logic one and the output of inverter 122 goes to logic zero. With one input of AND gate 120 at logic zero, the $\overline{\text{LSCLK}}$ clock signal at its output is also logic zero. AND gate 118 receives logic ones from inverter 128 and NOR gate 114 for providing a logic one LSCLK clock signal. The high state of LSCLK and low state of $\overline{\text{LSCLK}}$ are thus established by a second $\overline{\text{WINDOW}}$ pulse ideally with transitions at the rising edge of HSCLK, thereby completing one cycle. If the transitions of HSCLK and LSCLK are not aligned, low-speed clock generator 22 makes necessary corrections as described below. The LSCLK and $\overline{\text{LSCLK}}$ clock signals are non-overlapping and opposite phase.

The LSCLK and $\overline{\text{LSCLK}}$ clock signals must be aligned to the HSCLK clock signal in the local quadrant. A key feature of the present invention is the ability to monitor the buffered LSCLK and $\overline{\text{LSCLK}}$ clock signals and compare against the HSCLK clock signal during the $\overline{\text{WINDOW}}$ pulse. Control circuit 130 performs the comparison and uses the result to adjust the values in shift registers 90 and 92 which in turn control the delay of the LSCLK and $\overline{\text{LSCLK}}$ clock signals via transmission gates 94-102 and inverters 74-88. Shift register 90 controls the falling edge of LSCLK, while shift register 92 controls the rising edge of LSCLK. If the LSCLK and $\overline{\text{LSCLK}}$ clock signals are lagging the HSCLK clock signal, then the logic one position in the corresponding shift register is shifted left for less delay. Conversely, if the LSCLK and $\overline{\text{LSCLK}}$ clock signals are leading the HSCLK clock signal, then the logic one position is shifted right for more delay.

Figure 4:
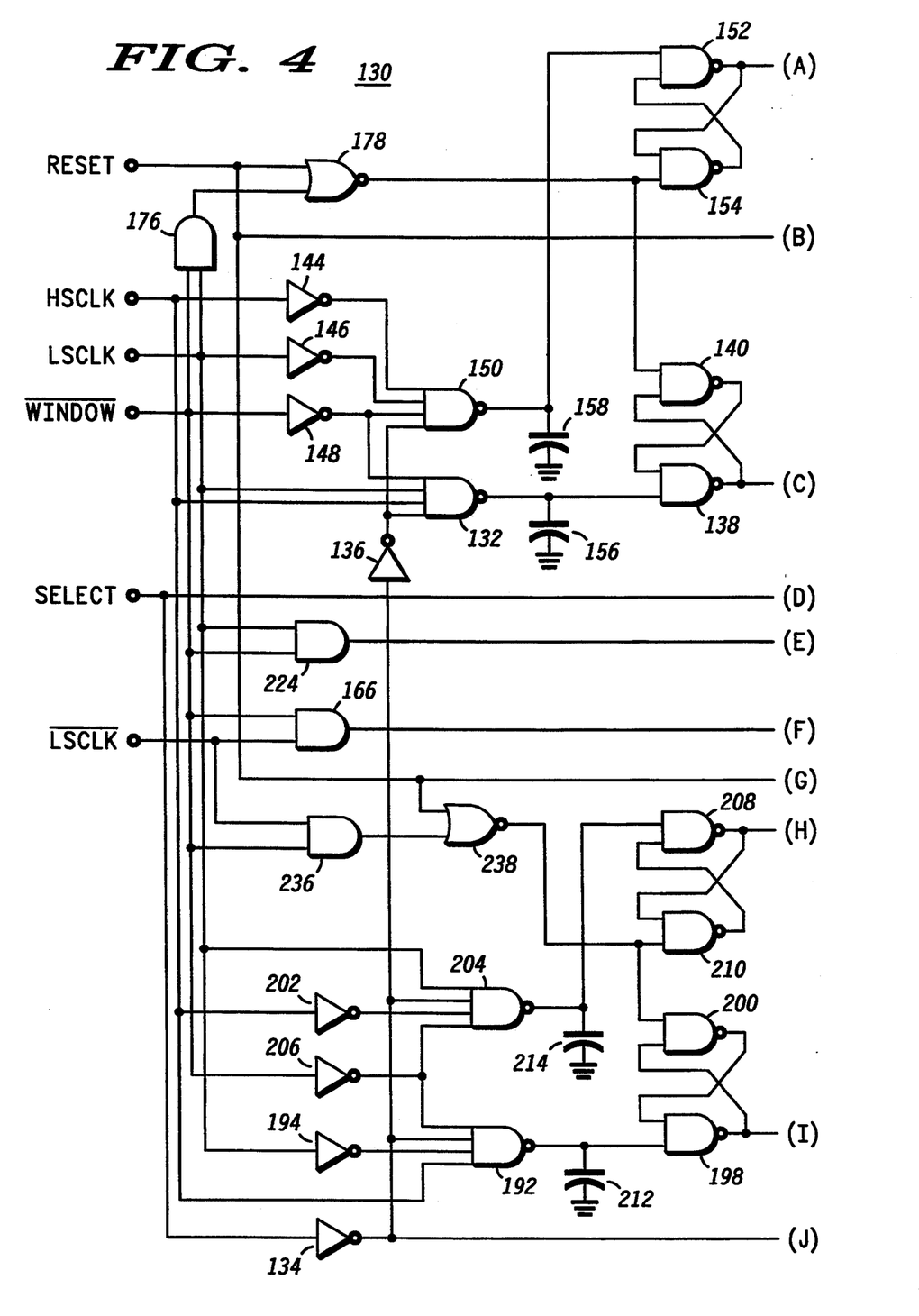
FIGS. 4 and 5 are a schematic diagram illustrating the control circuit of FIG. 3.
Figure 5:
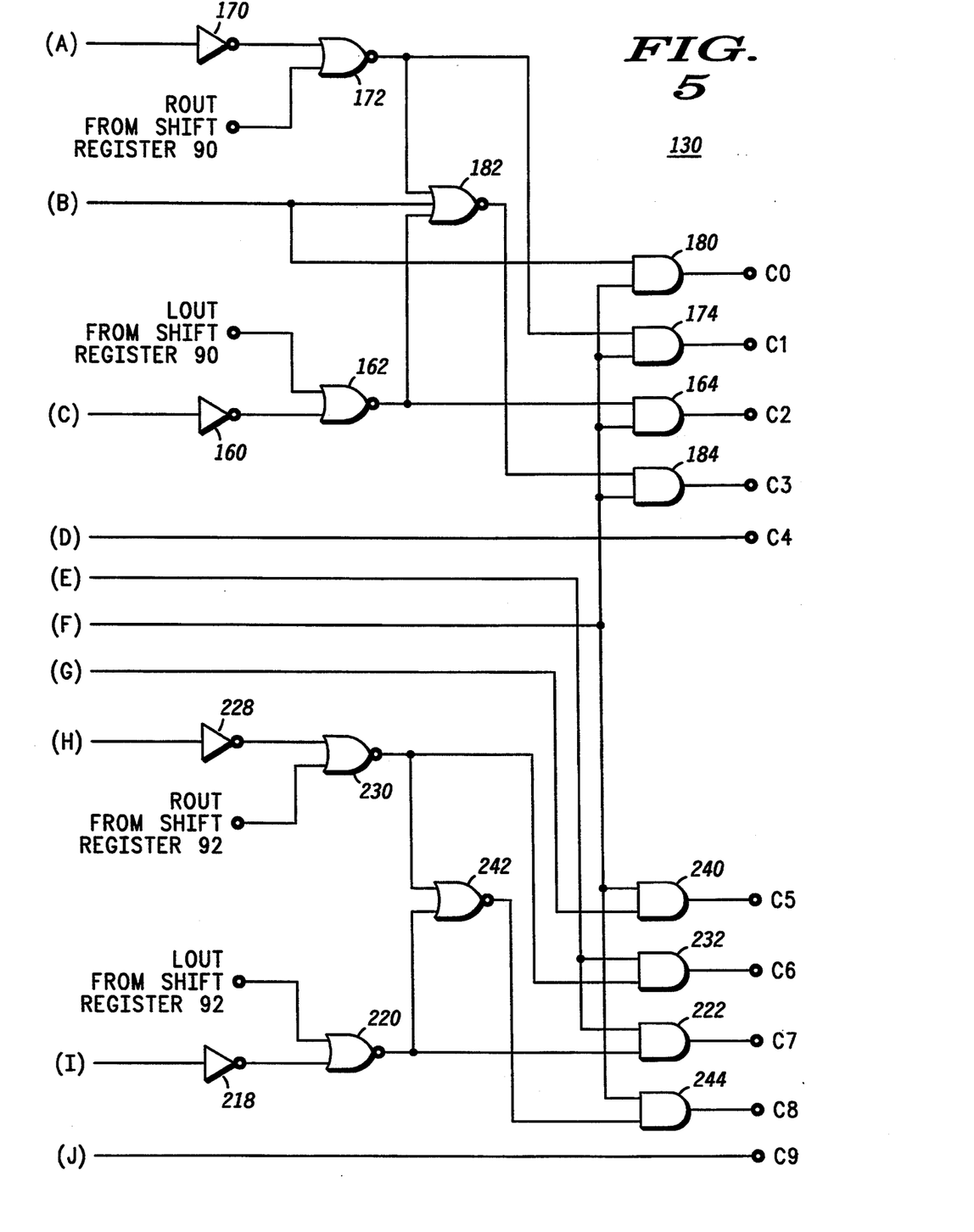

Control circuit 130 is shown in FIGS. 4 and 5 with separate sections for monitoring the falling edge and rising edge of the LSCLK clock signal. First consider monitoring the falling edge of LSCLK where NAND gate 132 receives the HSCLK clock signal and the LSCLK clock signal. Recall SELECT is logic one during the $\overline{\text{WINDOW}}$ pulse when the falling edge of LSCLK is alignment checked against the rising edge of HSCLK. The SELECT signal is still logic one following inverters 134 and 136 to enable the detection of any misalignment between HSCLK and LSCLK by NAND gates 132 and 150. A logic zero SELECT signal disables detection by NAND gates 132 and 150. The output signal of NAND gate 132 is applied to NAND latch 138-140. The HSCLK clock signal and the LSCLK clock signal are also complemented by inverters 144 and 146 and applied to the inputs of NAND gate 150. The $\overline{\text{WINDOW}}$ pulse is inverted by inverter 148 and applied to NAND gates 132 and 150. The output signal of NAND gate 150 is applied to NAND latch 152-154.

If the falling edge of LSCLK lags the rising edge of HSCLK (occurs later in time), then all inputs of NAND gate 132 are logic one before falling edge of LSCLK. A logic zero pulse appears at the output of NAND gate 132. If the logic zero pulse is of sufficient duration, say 1.0 ns, NAND latch 138-140 latches a logic one at its output thereby indicating misalignment of HSCLK and LSCLK clock signals and initiating corrective action by ultimately shifting the logic one in shift register 90 one position to the left to decrease delay of LSCLK. Capacitors 156 and 158 may be coupled to the outputs of NAND gates 132 and 150, respectively, to slow the response and ensure that HSCLK and LSCLK are separated by at least 1.0 ns before triggering the NAND latches.

Having established a logic one at the output of NAND latch 138-140 indicating a lagging LSCLK clock signal at its falling edge, it is necessary to reduce the delay of the LSCLK clock signal by moving the logic one in shift register 90 one position to the left. Accordingly, the logic one from NAND latch 138-140 is inverted by inverter 160 in FIG. 5 and applied to a first input of NOR gate 162. The second input of NOR gate 162 receives the LOUT signal from shift register 90. LOUT is the logic state of the left-most bit position. IF LOUT is logic zero, then shift register 90 may shift left. If LOUT is logic one, then shift register 90 has reached a limit and cannot shift left. The present state of shift register 90 is "00100", thus, LOUT is logic zero and a shift left is possible. With logic zeroes at the inputs of NOR gate 162, its output goes to logic one. AND gate 164 receives logic ones from NOR gate 162 and from AND gate 166 of FIG. 4 when $\overline{\text{LSCLK}}$ and $\overline{\text{WINDOW}}$ are logic one. The C2 control signal goes to logic one to initiate a shift left operation in shift register 90. The Q0-Q4 output state of shift register 90 goes to "01000", thereby enabling transmission gate 96 and reducing the delay of the LSCLK clock signal by 1.0 ns to bring HSCLK and LSCLK clock signals in closer alignment. If the falling edge of LSCLK and rising edge of HSCLK are still misaligned by more than 1.0 ns, NAND latch 138-140 will latch another logic one during a subsequent $\overline{\text{WINDOW}}$ pulse resulting in another shift left for shift register 90. The process continues until the falling edge of LSCLK and the rising edge of HSCLK are aligned within 1.0 ns, or until shift register 90 reaches it limit of operation. The width of shift registers 90 and 92 should be selected to provide adequate adjustment range for the intended application.

If on the other hand the falling edge of LSCLK leads the rising edge of HSCLK (occurs earlier in time), then all inputs of NAND gate 150 are logic one after falling edge of LSCLK because HSCLK and LSCLK are complemented by inverters 144 and 146. A logic zero pulse appears at the output of NAND gate 150. If the logic zero pulse is at least 1.0 ns in duration, NAND latch 152-154 latches a logic one at its output thereby indicating misalignment of HSCLK and LSCLK clock signals and initiating corrective action by ultimately shifting the logic one in shift register 90 one position to the right to increase delay of LSCLK.

A logic one at the output of NAND latch 152-154 indicates a leading LSCLK clock signal at its falling edge. It is necessary to increase the delay of the LSCLK clock signal by moving the logic one in shift register 90 one position to the right. Accordingly, the logic one from NAND latch 152-154 is inverted by inverter 170 in FIG. 5 and applied to a first input of NOR gate 172. The second input of NOR gate 172 receives the ROUT signal from shift register 90. ROUT is the logic state of the right-most bit position. IF ROUT is logic zero, then shift register 90 may shift right. If ROUT is logic one, then shift register 90 has reached a limit and cannot shift right. If the present state of shift register 90 is "00100", ROUT is logic zero and a shift right is valid. With logic zeroes at the inputs of NOR gate 172, its output goes to logic one. AND gate 174 receives logic ones from NOR gate 172 and from AND gate 166 of FIG. 4 when $\overline{\text{LSCLK}}$ and $\overline{\text{WINDOW}}$ are logic one. The C1 control signal goes to logic one to initiate a shift right operation in shift register 90. The Q0-Q4 output state of shift register 90 goes to "00010", thereby enabling transmission gate 100 and increasing the delay of the LSCLK clock signal by 1.0 ns to bring HSCLK and LSCLK clock signals in closer alignment. If the falling edge of LSCLK and rising edge of HSCLK are still misaligned by more than 1.0 ns, NAND latch 152-154 will latch another logic one during a subsequent $\overline{\text{WINDOW}}$ pulse resulting in another shift right for shift register 90. The process continues until the falling edge of LSCLK and the rising edge of HSCLK are aligned within 1.0 ns.

NAND latches 138-140 and 152-154 are cleared after the next WINDOW pulse when the rising edge of LSCLK is alignment checked against the rising edge of HSCLK. A logic one LSCLK and logic one $\overline{\text{WINDOW}}$ applied to AND gate 176 produces a logic zero at the output of NOR gate 178. The outputs of NAND latches 138-140 and 152-154 return to logic zero.

Control circuit 130 also provides a C0 control signal to shift register 90 when the RESET signal is an active logic one and $\overline{\text{LSCLK}}$ and $\overline{\text{WINDOW}}$ are logic one causing the output of AND gate 166 to be logic one. The C0 control signal from AND gate 180 resets shift register 90 to its initial state of "00100". NOR gate 182 activates a C3 control signal when NOR gates 162 and 172 are logic zero (no shift left or shift right operation, and no reset function) and when $\overline{\text{LSCLK}}$ and $\overline{\text{WINDOW}}$ are logic one causing the output of AND gate 166 to be logic one. The C3 control signal from AND gate 184 refreshes the present state of shift register 90. The SELECT signal from NOR gate 60 feeds directly through as a C4 control signal to alternately enable and tri-state the Q0–Q4 outputs of shift register 90.

Another section of control circuit 130 monitors the rising edge of the LSCLK clock signal to maintain overall alignment with the HSCLK clock signal. NAND gate 192 receives the HSCLK clock signal and the LSCLK clock signal inverted by inverter 194. The SELECT signal is now logic zero during the $\overline{\text{WINDOW}}$ pulse when the rising edge of LSCLK is alignment checked against the rising edge of HSCLK. The SELECT signal becomes logic one following inverter 134 to enable the detection of any misalignment between HSCLK and LSCLK by NAND gates 192 and 204. A logic one SELECT signal disables detection by NAND gates 192 and 204. The output signal of NAND gate 192 is applied to NAND latch 198–200. The LSCLK clock signal and the HSCLK clock signal, complemented by inverter 202, are applied to the inputs of NAND gate 204. The $\overline{\text{WINDOW}}$ pulse is inverted by inverter 206 and applied to NAND gates 192 and 204. The output signal of NAND gate 204 is applied to NAND latch 208–210.

If the rising edge of LSCLK lags the rising edge of HSCLK, then all inputs of NAND gate 192 are logic one because LSCLK is inverted by inverter 194. A logic zero pulse appears at the output of NAND gate 192. If the logic zero pulse is at least 1.0 ns in duration, NAND latch 198–200 latches a logic one at its output thereby indicating misalignment of HSCLK and LSCLK clock signals and initiating corrective action by ultimately shifting the logic one in shift register 92 one position to the left to decrease delay of LSCLK. Capacitors 212 and 214 may be coupled to the outputs of NAND gates 192 and 204, respectively, to slow the response and ensure that HSCLK and LSCLK are separated by at least 1.0 ns before triggering the NAND latches.

Having established a logic one at the output of NAND latch 198–200 indicating a lagging LSCLK clock signal at its rising edge, it is necessary to reduce the delay of the LSCLK clock signal by moving the logic one in shift register 92 one position to the left. Accordingly, the logic one from NAND latch 198–200 is inverted by inverter 218 in FIG. 5 and applied to a first input of NOR gate 220. The second input of NOR gate 220 receives the LOUT signal from shift register 92. LOUT is the logic state of the left-most bit position. IF LOUT is logic zero, then shift register 92 may shift left. If LOUT is logic one, then shift register 92 has reached a limit and cannot shift left. If the present state of shift register 92 is "00100", then LOUT is logic zero and a shift left is possible. With logic zeroes at the inputs of NOR gate 220, its output goes to logic one. AND gate 222 receives logic ones from NOR gate 220 and from AND gate 224 of FIG. 4 when LSCLK and $\overline{\text{WINDOW}}$ are logic one. The C7 control signal goes to logic one to initiate a shift left operation in shift register 92.

The Q0–Q4 output state of shift register 92 goes to "01000", thereby enabling transmission gate 96 and reducing the delay of the LSCLK clock signal by 1.0 ns to bring HSCLK and LSCLK clock signals in closer alignment. If the rising edge of HSCLK and rising edge of LSCLK are still misaligned by more than 1.0 ns, NAND latch 198–200 will latch another logic one during a subsequent $\overline{\text{WINDOW}}$ pulse resulting in another shift left for shift register 92. The process continues until the rising edge of HSCLK and the rising edge of LSCLK are aligned within 10 ns.

Conversely, if the rising edge of LSCLK leads the rising edge of HSCLK, then all inputs of NAND gate 204 are logic one after the rising edge of LSCLK because HSCLK is complemented by inverter 202. A logic zero pulse appears at the output of NAND gate 204. If the logic zero pulse is at least 1.0 ns in duration, NAND latch 208–210 latches a logic one at its output thereby indicating misalignment of the HSCLK and LSCLK clock signals and initiating corrective action by ultimately shifting the logic one in shift register 92 one position to the right to increase delay of LSCLK.

A logic one at the output of NAND latch 208–210 indicates a leading LSCLK clock signal at its rising edge. It is necessary to increase the delay of the LSCLK clock signal by moving the logic one in shift register 92 one position to the right. Accordingly, the logic one from NAND latch 208–210 is inverted by inverter 228 in FIG. 5 and applied to a first input of NOR gate 230. The second input of NOR gate 230 receives the ROUT signal from shift register 92. ROUT is the logic state of the right-most bit position. IF ROUT is logic zero, then shift register 92 may shift right. If ROUT is logic one, then shift register 92 has reached a limit and cannot shift right. If the present state of shift register 92 is "00100", ROUT is logic zero and a shift right is valid. With logic zeroes at the inputs of NOR gate 230, its output goes to logic one. AND gate 232 receives logic ones from NOR gate 230 and from AND gate 224 of FIG. 4 when LSCLK and $\overline{\text{WINDOW}}$ are logic one. The C6 control signal goes to logic one to initiate a shift right operation in shift register 92. The Q0–Q4 output state of shift register 92 goes to "00010", thereby enabling transmission gate 100 and increasing the delay of the LSCLK clock signal by 1.0 ns to bring HSCLK and LSCLK clock signals in closer alignment. If the rising edge of HSCLK and rising edge of LSCLK are still misaligned by more than 1.0 ns, NAND latch 208–210 will latch another logic one during a subsequent $\overline{\text{WINDOW}}$ pulse resulting in another shift right for shift register 92. The process continues until the rising edge of HSCLK and the rising edge of LSCLK are aligned within 1.0 ns.

NAND latches 198–200 and 208–210 are cleared after the next $\overline{\text{WINDOW}}$ pulse when the falling edge of LSCLK is alignment checked against the rising edge of HSCLK. A logic one $\overline{\text{LSCLK}}$ and logic one $\overline{\text{WINDOW}}$ applied to AND gate 236 produces a logic zero at the output of NOR gate 238. The outputs of NAND latches 198–200 and 208–210 return to logic zero.

Control circuit 130 also provides a C5 control signal to shift register 92 when the RESET signal is an active logic one and $\overline{\text{LSCLK}}$ and $\overline{\text{WINDOW}}$ are logic one causing the output of AND gate 166 to be logic one. The C5 control signal from AND gate 240 resets shift register 92 to its initial state of "00100". NOR gate 242 activates a C8 control signal when NOR gates 220 and 230 are logic zero (no shift left or shift right operation, and no reset function) and when and $\overline{\text{LSCLK}}$ and $\overline{\text{WIN}}$ DOW are logic one causing the output of AND gate 166 to be logic one. The C8 control signal from AND gate 244 refreshes the present state in shift register 92. The SELECT signal inverted by inverter 134 feeds directly through as a C9 control signal to alternately enable and tri-state the Q0-Q4 outputs of shift register 92.

Other features may include widening shift registers 90 and 92 to say eleven or more bits with corresponding transmission gates like 94-102 and inverters like 74-88 for greater adjustment range. The adjustment resolution of low-speed clock generator 22 is determined by two inverter delays like 74-76. Hence, inverters 74-88 may be made with shorter delays to increase the alignment resolution.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A circuit for generating first and second clock signals, comprising:
   first means for generating the first clock signal and further including means for generating window pulses each substantially centered about every other n-th transition of the first clock signal; and
   second means coupled for receiving said window pulses and the first clock signal from said first means for generating a first state of the second clock signal upon receiving a first one of said window pulses and a second state of the second clock signal upon receiving a second one of said window pulses such that transitions of the second clock signal are substantially aligned with transitions of the first clock signal.

2. The circuit of claim 1 wherein said second means includes:
   a first shift register having first and second outputs;
   a first transmission gate having a control input and first and second conduction terminals, said control input being coupled to said first output of said first shift register, said first conduction terminal being coupled to a first node, said second conduction terminal being coupled to a second node;
   a first inverter having an input coupled to said first node and having an output;
   a second inverter having an input coupled to said output of said first inverter and having an output; and
   a second transmission gate having a control input and first and second conduction terminals, said control input being coupled to said second output of said first shift register, said first conduction terminal being coupled to said output of said second inverter, said second conduction being coupled to said second node.

3. The circuit of claim 2 wherein said second means further includes:
   a third transmission gate having first and second control inputs and first and second conduction terminals, said first control input receiving said window pulses;
   a third inverter having an input receiving said window pulses and having an output coupled to said second control input of said third transmission gate;
   a fourth inverter having an input coupled to said second conduction terminal of said third transmission gate and having an output coupled to said first node;
   a fourth transmission gate having first and second control inputs and first and second conduction terminals, said first control input being coupled to said output of said third inverter, said second control receiving said window pulses, said first conduction terminal being coupled to said output of said fourth inverter;
   a first NOR gate having first and second inputs and an output, said first input being coupled to said second conduction terminal of said fourth transmission gate, said second input receiving a reset signal; and
   a fifth inverter having an input coupled to said output of said first NOR gate and having an output coupled to said first conduction terminal of said third transmission gate.

4. The circuit of claim 3 wherein said second means further includes:
   a second NOR gate having first and second inputs and an output, said first input being coupled to said second node, said second input receiving said reset signal;
   a first AND gate having first and second inputs and an output, said first input being coupled to said output of said second NOR gate;
   a first buffer having an input coupled to said output of said first AND gate and having an output for providing the second clock signal;
   a sixth inverter having an input coupled to said output of said second NOR gate and having an output;
   a second AND gate having first and second inputs and an output, said first input being coupled to said output of said sixth inverter;
   a second buffer having an input coupled to said output of said second AND gate and having an output for providing an inverted second clock signal;
   a seventh inverter having an input coupled to said output of said first AND gate and having an output coupled to said second input of said second AND gate; and
   an eighth inverter having an input coupled to said output of said second AND gate and having an output coupled to said second input of said first AND gate.

5. The circuit of claim 2 wherein said second means includes:
   a second shift register having first and second outputs and a control input, said first output being coupled to said control input of said first transmission gate, said second output being coupled to said control input of said second transmission gate; and
   a control circuit receiving the first clock signal at a first input, the second clock signal at a second input, said window pulses at a third input and providing first control signals to a control input of said first shift register and second control signals to said control input of said second shift register.

6. The circuit of claim 5 wherein said control circuit includes:
   a first NAND gate having first, second and third inputs and an output, said first input receiving the first clock signal, said second input receiving the second clock signal;

a first latching circuit having an input coupled to said output of said first NAND gate and having an output;

a third inverter having an input receiving said window pulses and having an output coupled to said third input of said first NAND gate;

a fourth inverter having an input receiving the first clock signal and having an output;

a fifth inverter having an input receiving the second clock signal and having an output;

a second NAND gate having first, second and third inputs and an output, said first input being coupled to said output of said fourth inverter, said second input being coupled to said output of said fifth inverter, said third input being coupled to said output of said third inverter;

a second latching circuit having an input coupled to said output of said second NAND gate and having an output;

a sixth inverter having an input coupled to said output of said first latching circuit and having an output;

a first NOR gate having first and second inputs and an output, said first input being coupled to said output of said sixth inverter, said second input being coupled to a right most significant bit of said first shift register, said output providing a first one of said first control signals;

a seventh inverter having an input coupled to said output of said second latching circuit and having an output; and a second NOR gate having first and second inputs and an output, said first input being coupled to said output of said seventh inverter, said second input being coupled to a left most significant bit of said first shift register, said output providing a second one of said first control signals.

7. A method of generating first and second clock signals, comprising the steps of:

generating the first clock signal;

generating window pulses each substantially centered about every other n-th transition of the first clock signal; and generating a first state of the second clock signal at an edge of a first one of said window pulses and a second state of the second clock signal at an edge of a second one of said window pulses such that transitions of the second clock signal are substantially aligned with transitions of the first clock signal.

8. An integrated clock generation circuit, comprising:

first means for generating a first clock signal and further including means for generating window pulses each substantially centered about every other n-th transition of said first clock signal;

second means coupled for receiving said window pulses and the first clock signal from said first means for generating a first state of a second clock signal upon receiving a first one of said window pulses and a second state of said second clock signal upon receiving a second one of said window pulses;

a first shift register having first and second outputs;

a first transmission gate having a control input and first and second conduction terminals, said control input being coupled to said first output of said first shift register, said first conduction terminal being coupled to a first node, said second conduction terminal being coupled to a second node;

a first inverter having an input coupled to said first node and having an output;

a second inverter having an input coupled to said output of said first inverter and having an output; and a second transmission gate having a control input and first and second conduction terminals, said control input being coupled to said second output of said first shift register, said first conduction terminal being coupled to said output of said second inverter, said second conduction being coupled to said second node.

9. The clock generation circuit of claim 8 wherein said second means includes:

a third transmission gate having first and second control inputs and first and second conduction terminals, said first control input receiving said window pulses;

a third inverter having an input receiving said window pulses and having an output coupled to said second control input of said third transmission gate;

a fourth inverter having an input coupled to said second conduction terminal of said third transmission gate and having an output coupled to said first node;

a fourth transmission gate having first and second control inputs and first and second conduction terminals, said first control input being coupled to said output of said third inverter, said second control receiving said window pulses, said first conduction terminal being coupled to said output of said fourth inverter;

a first NOR gate having first and second inputs and an output, said first input being coupled to said second conduction terminal of said fourth transmission gate, said second input receiving a reset signal; and a fifth inverter having an input coupled to said output of said first NOR gate and having an output coupled to said first conduction terminal of said third transmission gate.

10. The clock generation circuit of claim 9 further including:

a second NOR gate having first and second inputs and an output, said first input being coupled to said second node, said second input receiving said reset signal;

a first AND gate having first and second inputs and an output, said first input being coupled to said output of said second NOR gate;

a first buffer having an input coupled to said output of said first AND gate and having an output for providing said second clock signal;

a sixth inverter having an input coupled to said output of said second NOR gate and having an output;

a second AND gate having first and second inputs and an output, said first input being coupled to said output of said sixth inverter;

a second buffer having an input coupled to said output of said second AND gate and having an output for providing an inverted second clock signal;

a seventh inverter having an input coupled to said output of said first AND gate and having an output coupled to said second input of said second AND gate; and an eighth inverter having an input coupled to said output of said second AND gate and having an output coupled to said second input of said first AND gate.

11. The clock generation circuit of claim 8 further including:
   a second shift register having first and second outputs and a control input, said first output being coupled to said control input of said first transmission gate, said second output being coupled to said control input of said second transmission gate; and
   a control circuit receiving said first clock signal at a first input, said second clock signal at a second input, said window pulses at a third input and providing first control signals to a control input of said first shift register and second control signals to said control input of said second shift register.

12. The clock generation circuit of claim 11 wherein said control circuit includes:
   a first NAND gate having first, second and third inputs and an output, said first input receiving said first clock signal, said second input receiving said second clock signal;
   a first latching circuit having an input coupled to said output of said first NAND gate and having an output;
   a third inverter having an input receiving said window pulses and having an output coupled to said third input of said first NAND gate;
   a fourth inverter having an input receiving said first clock signal and having an output;
   a fifth inverter having an input receiving said second clock signal and having an output;
   a second NAND gate having first, second and third inputs and an output, said first input being coupled to said output of said fourth inverter, said second input being coupled to said output of said fifth inverter, said third input being coupled to said output of said third inverter;
   a second latching circuit having an input coupled to said output of said second NAND gate and having an output;
   a sixth inverter having an input coupled to said output of said first latching circuit and having an output;
   a first NOR gate having first and second inputs and an output, said first input being coupled to said output of said sixth inverter, said second input being coupled to a right most significant bit of said first shift register, said output providing a first one of said first control signals;
   a seventh inverter having an input coupled to said output of said second latching circuit and having an output; and
   a second NOR gate having first and second inputs and an output, said first input being coupled to said output of said seventh inverter, said second input being coupled to a left most significant bit of said first shift register, said output providing a second one of said first control signals.

* * * * *